(12) United States Patent
Nishimine

(10) Patent No.: US 10,173,694 B2
(45) Date of Patent: Jan. 8, 2019

(54) TRAVELING CONTROL DEVICE FOR VEHICLE

(71) Applicant: TOYOTA JIDOSHA KABUSHIKI KAISHA, Toyota-shi, Aichi-ken (JP)

(72) Inventor: Akiko Nishimine, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 2 days.

(21) Appl. No.: 15/685,083

(22) Filed: Aug. 24, 2017

(65) Prior Publication Data
US 2018/0065643 A1   Mar. 8, 2018

(30) Foreign Application Priority Data

Sep. 7, 2016   (JP) .................................. 2016-175080

(51) Int. Cl.
| | |
|---|---|
| B60W 50/08 | (2012.01) |
| B60W 20/15 | (2016.01) |
| B60W 10/06 | (2006.01) |
| B60W 10/08 | (2006.01) |
| B60W 20/20 | (2016.01) |
| B60W 50/00 | (2006.01) |

(52) U.S. Cl.
CPC .......... *B60W 50/082* (2013.01); *B60W 10/06* (2013.01); *B60W 10/08* (2013.01); *B60W 20/15* (2016.01); *B60W 20/20* (2013.01); *B60W 50/0098* (2013.01); *B60W 2530/00* (2013.01); *B60W 2710/0666* (2013.01); *B60W 2710/083* (2013.01); *Y10S 903/93* (2013.01)

(58) Field of Classification Search
CPC .... B60W 50/082; B60W 10/06; B60W 10/08; B60W 20/20; B60W 20/15; B60W 50/0098; B60W 2530/00; B60W 2710/0666; B60W 2710/083; Y10S 903/93
See application file for complete search history.

(56) References Cited

U.S. PATENT DOCUMENTS

| | | | |
|---|---|---|---|
| 5,774,069 A | * | 6/1998 | Tanaka ...................... B60T 7/12 180/167 |
| 5,906,645 A | | 5/1999 | Kagawa et al. |
| | | | (Continued) |

FOREIGN PATENT DOCUMENTS

JP       H09-222922 A      8/1997

*Primary Examiner* — Rodney A Butler
(74) *Attorney, Agent, or Firm* — Oliff PLC

(57) ABSTRACT

A traveling control device for a vehicle includes an electronic control device. The vehicle includes drive power sources. The electronic control device is configured to select, according to a traveling state of the vehicle, a traveling mode from among traveling modes. One or more predetermined drive power sources is used for driving the vehicle in each traveling mode. The one or more predetermined drive power sources in the respective traveling modes is different from each other. The electronic control device is configured to drive the vehicle by using the selected traveling mode, switch between automatic driving by automatic driving control and manual driving by a driving operation from a driver, and when the selected traveling mode switches, inhibit, after switching of the selected traveling mode starts, switching between the automatic driving and the manual driving until the switching of the selected traveling mode is completed.

8 Claims, 7 Drawing Sheets

(56) References Cited

U.S. PATENT DOCUMENTS

| | | | |
|---|---|---|---|
| 2010/0250049 A1* | 9/2010 | Nihei | B60K 23/0808 |
| | | | 701/31.4 |
| 2014/0290421 A1* | 10/2014 | Baumer | F16H 59/0204 |
| | | | 74/491 |
| 2014/0330474 A1* | 11/2014 | Tsuda | B60K 6/485 |
| | | | 701/22 |

\* cited by examiner

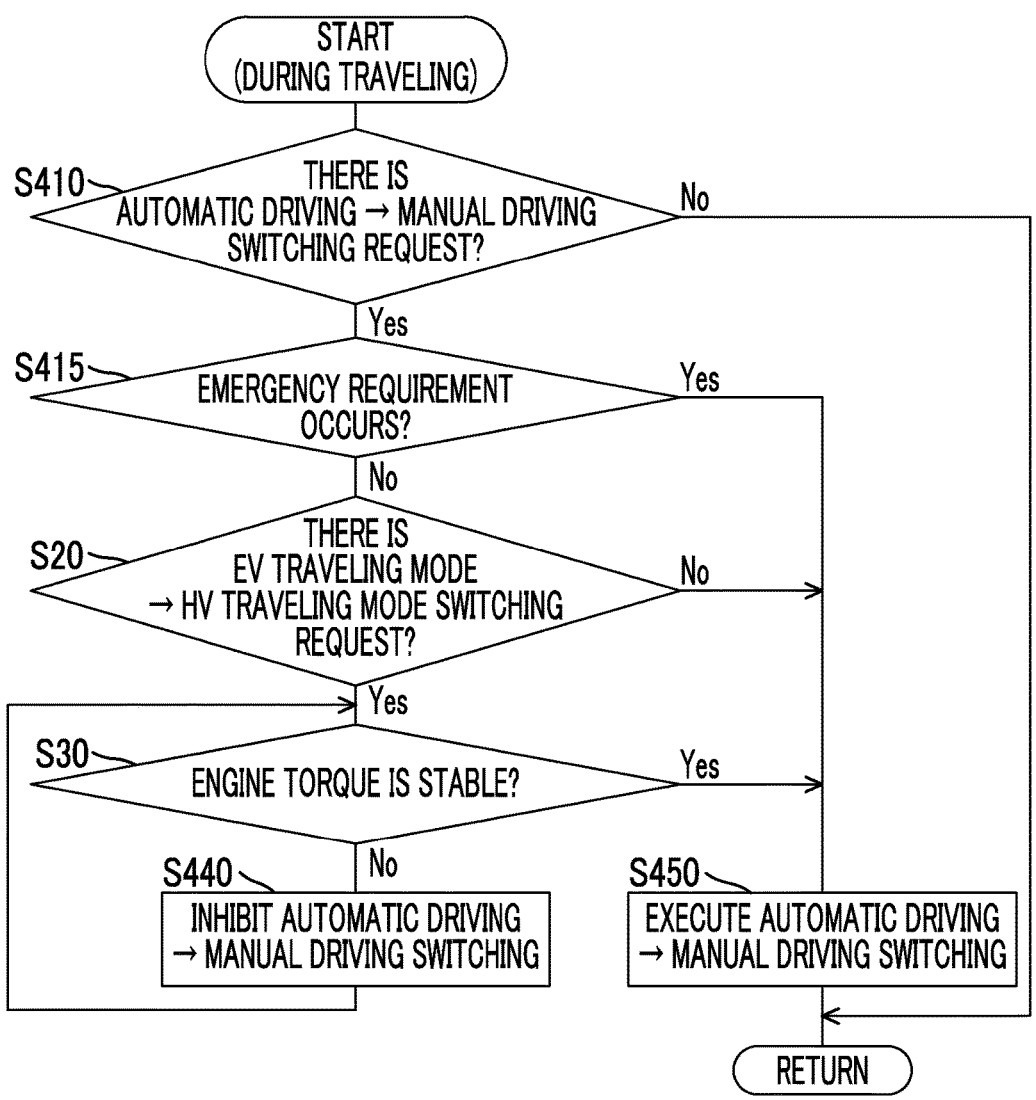

TRAVELING CONTROL DEVICE FOR VEHICLE

INCORPORATION BY REFERENCE

The disclosure of Japanese Patent Application No. 2016-175080 filed on Sep. 7, 2016 including the specification, drawings and abstract is incorporated herein by reference in its entirety.

BACKGROUND

1. Technical Field

The present disclosure relates to a traveling control device for a vehicle.

2. Description of Related Art

A traveling control device for a vehicle that switches between automatic driving by automatic driving control and manual driving by a driving operation from a driver is well known. For example, an automatic driving control device for a vehicle described in Japanese Unexamined Patent Application Publication No. 9-222922 (JP 9-222922 A) is known. JP 9-222922 A discloses a vehicle that can switch between automatic driving to perform autonomous traveling by controlling a vehicle speed or a steering angle based on signals from various sensors and manual driving by a driving operation from a driver.

SUMMARY

In a vehicle that includes a plurality of drive power sources, a plurality of traveling modes, in which different drive power sources are used as a drive torque source generating drive torque, can be switched according to a traveling state. For example, in a hybrid vehicle that includes an engine and a rotating machine as a drive power source, a hybrid traveling mode in which at least the engine is used as the drive torque source and a motor traveling mode in which the rotating machine is exclusively used as the drive torque source can be switched according to a traveling state. When switching of the traveling modes is performed, for example, in a case where switching is made between automatic driving to perform control corresponding to a peripheral condition of the vehicle and manual driving to perform control in consideration of a driver's intention, it is considered that control (for example, control for changing torque of the drive torque source switched in operation at the time of switching of the traveling modes) at the time of switching of the traveling modes is switched between control for automatic driving and control for manual driving. In this manner, the control at the time of switching of the traveling modes is likely to be discontinuous due to switching between automatic driving and manual driving, and accordingly, there is a concern that a shock occurs.

The disclosure provides a traveling control device for a vehicle capable of preventing a shock caused by switching between automatic driving and manual driving at the time of switching of traveling modes.

An aspect of the disclosure provides a traveling control device for a vehicle. The vehicle includes drive power sources. The traveling control device includes an electronic control device. The electronic control device is configured to select, according to a traveling state of the vehicle, a traveling mode from among traveling modes. One or more predetermined drive power sources among the drive power sources is used for driving the vehicle in each traveling mode. The one or more predetermined drive power sources in the respective traveling modes is different from each other. The electronic control unit is configured to drive the vehicle by using the selected traveling mode, switch between automatic driving by automatic driving control and manual driving by a driving operation from a driver, and when the selected traveling mode switches, inhibit, after switching of the selected traveling mode starts, switching between the automatic driving and the manual driving until the switching of the selected traveling mode is completed.

With this configuration, since switching between the automatic driving and the manual driving is inhibited until switching of the traveling modes is completed after switching of the traveling modes starts, control at the time of switching of the traveling modes is avoided from being switched between control for the automatic driving and control for the manual driving, and discontinuity of the control at the time of switching of the traveling modes does not occur. Therefore, it is possible to prevent a shock caused by switching between automatic driving and manual driving at the time of switching of the traveling modes.

In the aspect of the disclosure, the drive power sources may include an engine and a rotating machine. The traveling modes may include a hybrid traveling mode in which at least the engine is used as a drive torque source generating drive torque when the vehicle travels, and a motor traveling mode in which the rotating machine is used as the drive torque source. The electronic control device may be configured to inhibit, when switching from the motor traveling mode to the hybrid traveling mode is performed, the switching between the automatic driving and the manual driving until a self-sustaining operation of the engine is enabled after the engine starts.

With this configuration, since switching between the automatic driving and the manual driving is inhibited until the self-sustaining operation of the engine is enabled at the time of switching from the motor traveling mode to the hybrid traveling mode, control at the time of switching from the motor traveling mode to the hybrid traveling mode is avoided from being switched between the control for the automatic driving and the control for the manual driving, and discontinuity of the control at the time of switching of the traveling modes does not occur.

In the aspect of the disclosure, the drive power sources may include an engine and a rotating machine. The traveling modes may include a hybrid traveling mode in which at least the engine is used as a drive torque source generating drive torque when the vehicle travels, and a motor traveling mode in which the rotating machine is used as the drive torque source. The electronic control device may be configured to inhibit, when switching from the hybrid traveling mode to the motor traveling mode is performed, the switching between the automatic driving and the manual driving until a stop of the engine is completed.

With this configuration, since switching between the automatic driving and the manual driving is inhibited until the stop of the engine is completed at the time of switching from the hybrid traveling mode to the motor traveling mode, control at the time of switching from the hybrid traveling mode to the motor traveling mode is avoided from being switched between the control for the automatic driving and the control for the manual driving, and discontinuity of the control at the time of switching of the traveling modes does not occur.

In the aspect of the disclosure, he drive power sources may include an engine, a first rotating machine, and a second rotating machine. The traveling modes may include a hybrid traveling mode in which at least the engine is used as a drive torque source generating drive torque when the vehicle travels, and a dual-drive motor traveling mode in which both of the first rotating machine and the second rotating machine are used as the drive torque source. The electronic control device may be configured to inhibit, when switching from the hybrid traveling mode to the dual-drive motor traveling mode is performed, the switching between the automatic driving and the manual driving until a stop of the engine is completed and until transition to dual-drive of the first rotating machine and the second rotating machine is completed.

With this configuration, since switching between the automatic driving and the manual driving is inhibited until the stop of the engine is completed and transition to dual-drive of the first rotating machine and the second rotating machine is completed at the time of switching from the hybrid traveling mode to the dual-drive motor traveling mode, control at the time of switching from the hybrid traveling mode to the dual-drive motor traveling mode is avoided from being switched between the control for the automatic driving and the control for the manual driving, and discontinuity of the control at the time of switching of the traveling modes does not occur.

In the aspect of the disclosure, the drive power sources may include a first rotating machine and a second rotating machine. The traveling modes may include a dual-drive motor traveling mode in which both of the first rotating machine and the second rotating machine are used as a drive torque source generating drive torque when the vehicle travels, and a single-drive motor traveling mode in which the second rotating machine is exclusively used as the drive torque source. The electronic control device may be configured to inhibit, when switching between the dual-drive motor traveling mode and the single-drive motor traveling mode is performed, the switching between the automatic driving and the manual driving until switching of an operation state of the first rotating machine is completed.

With this configuration, since switching between the automatic driving and the manual driving is inhibited until switching of the operation state of the first rotating machine is completed at the time of switching between the dual-drive motor traveling mode and the single-drive motor traveling mode, control at the time of switching between the dual-drive motor traveling mode and the single-drive motor traveling mode is avoided from being switched between the control for the automatic driving and the control for the manual driving, and discontinuity of the control at the time of switching of the traveling modes does not occur.

In the aspect of the disclosure, the electronic control device may be configured to switch to the manual driving when an emergency requirement occurs during the automatic driving, the emergency requirement indicating the automatic driving is unable to be performed safely, and permit, when switching from the automatic driving to the manual driving is performed with occurrence of the emergency requirement, the switching from the automatic driving to the manual driving, even until switching of the selected traveling mode is completed after switching of the selected traveling mode starts.

With this configuration, since switching from the automatic driving to the manual driving is not inhibited even until switching of the traveling modes is completed after switching of the traveling modes starts when switching from the automatic driving to the manual driving is performed with the occurrence of the emergency requirement, in a situation in which the automatic driving is unable to be performed safely, switching from the automatic driving to the manual driving is performed quickly even during switching of the traveling modes.

In the aspect of the disclosure, a state in which the self-sustaining operation of the engine is enabled may include a state in which torque of the engine reaches a predetermined target value.

In the aspect of the disclosure, a state in which the self-sustaining operation of the engine is enabled may include a state in which an elapsed time from the start of the switching of the traveling modes becomes equal to or longer than a predetermined time.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 is a flowchart illustrating a main part of control operation of an electronic control device, that is, control operation for preventing a shock caused by switching between automatic driving and manual driving at the time of switching of traveling modes, and shows an embodiment different from FIG. 3.

DETAILED DESCRIPTION OF EMBODIMENTS

Figure 1:
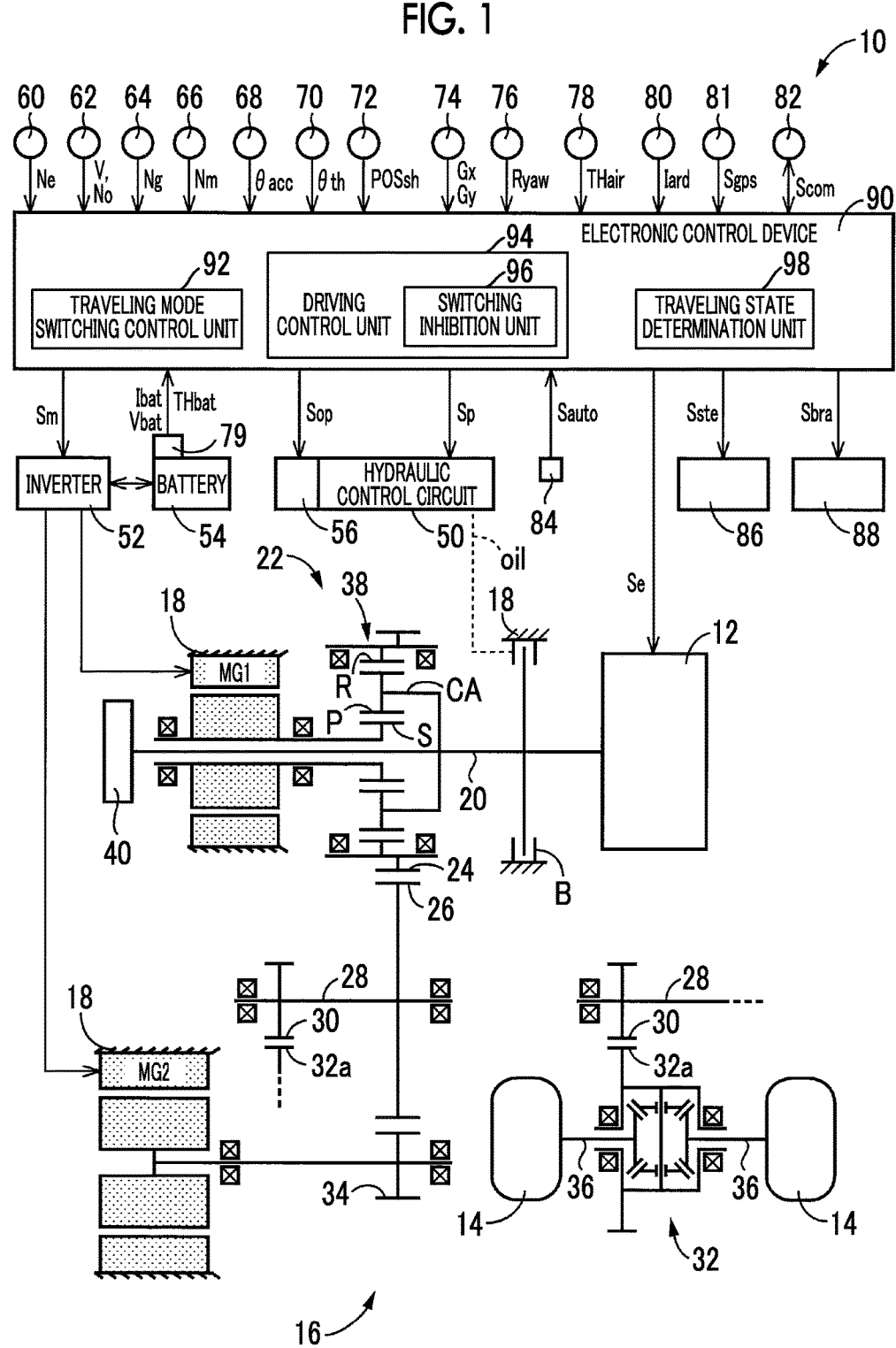
FIG. 1 is a diagram illustrating the schematic configuration of units related to traveling of a vehicle to which the disclosure is applied, and is a diagram illustrating a main part of a control system that controls the units.

Hereinafter, embodiments of the disclosure will be described in detail referring to the drawings.

Embodiment 1

FIG. 1 is a diagram illustrating the schematic configuration of units related to traveling of a vehicle 10 to which the disclosure is applied, and is a diagram illustrating a main part of a control system that controls the units. In FIG. 1, the vehicle 10 is a hybrid vehicle that includes, as a plurality of drive power sources, an engine 12, a first rotating machine MG1, and a second rotating machine MG2 to be a drive torque source generating drive torque. The vehicle 10 includes drive wheels 14, and a power transmission device 16 provided in a power transmission path between the engine 12 and the drive wheels 14.

The engine 12 is a known internal combustion engine that combusts predetermined fuel to output power, for example, a gasoline engine or a diesel engine. Operating states, such as a throttle opening degree, an intake air amount, a fuel supply amount, and an ignition timing, are controlled by an electronic control device 90 described below, whereby engine torque Te of the engine 12 is controlled.

Both of the first rotating machine MG1 and the second rotating machine MG2 are rotating machines to be a drive torque source, and are so-called motor generators having a function as an electric motor (motor) generating drive torque and a function as a power generator (generator). The first rotating machine MG1 and the second rotating machine MG2 are connected to a battery 54 described below through an inverter 52 described below. The inverter 52 is controlled by the electronic control device 90 described below, whereby MG1 torque Tg and MG2 torque Tm that are output torque (powering torque and regenerative torque) of the first rotating machine MG1 and the second rotating machine MG2 are controlled.

The power transmission device 16 includes, inside a case 18 as a non-rotating member attached to a vehicle body, an input shaft 20 coupled to the engine 12, a gear shift unit 22 coupled to the input shaft 20, a driven gear 26 that meshes with a drive gear 24 as an output rotating member of the gear shift unit 22, a driven shaft 28 that fixes the driven gear 26 to be relatively nonrotatable, a final gear 30 (the final gear 30 having a diameter smaller than the driven gear 26) that is fixed to the driven shaft 28 to be relatively nonrotatable, a differential gear 32 that meshes with the final gear 30 through a differential ring gear 32a, a reduction gear 34 (the reduction gear 34 having a diameter smaller than the driven gear 26) that meshes with the driven gear 26 and is coupled to the second rotating machine MG2, and the like. The power transmission device 16 includes an axle 36 coupled to the differential gear 32, and the like. In the power transmission device 16 configured as above, power of the engine 12, power of the first rotating machine MG1, or power of the second rotating machine MG2 is transmitted to the driven gear 26, and is transmitted from the driven gear 26 to the drive wheels 14 in sequence through the final gear 30, the differential gear 32, the axle 36, and the like.

The gear shift unit 22 has a planetary gear mechanism 38 as a power split device that splits (distributes has the same meaning) power transmitted from the engine 12 through the input shaft 20 to the first rotating machine MG1 and the drive gear 24. The planetary gear mechanism 38 is a known single-pinion type planetary gear device including a sun gear S, a pinion gear P, a carrier CA that supports the pinion gear P to be rotatable and revolvable, and a ring gear R that meshes the sun gear S through the pinion gear P, and functions as a differential mechanism that generates a differential action. In the planetary gear mechanism 38, the sun gear S is coupled to the first rotating machine MG1, the carrier CA is coupled to the engine 12 through the input shaft 20, and the ring gear R is formed in the inner peripheral surface of the drive gear 24. Accordingly, in the vehicle 10, the first rotating machine MG1 takes reaction force of the engine torque Te input to the carrier CA, whereby engine traveling is possible with directly transmitted torque (directly transmitted engine torque) mechanically transmitted from the engine 12 to the ring gear R and the MG2 torque Tm by the second rotating machine MG2. At this time, the second rotating machine MG2 is driven with generated electric power of the first rotating machine MG1 with power of the engine 12 split to the first rotating machine MG1. With this, the gear shift unit 22 functions as a known electric differential unit (electric continuously variable transmission) in which a gear ratio (gear shift ratio) is controlled according to an operating state of the first rotating machine MG1 being controlled when the inverter 52 is controlled by the electronic control device 90 described below.

The vehicle 10 further includes a mechanical oil pump 40 (hereinafter, referred to as an MOP 40) that is coupled to the input shaft 20 and is rotationally driven by the engine 12, a brake B as a lock mechanism that fixes the input shaft 20 (that is, fixes a crankshaft as a rotational shaft of the engine 12) with respect to the case 18, a hydraulic control circuit 50 that supplies engagement hydraulic pressure to the brake B, the inverter 52 that controls transmission and reception of electric power related to operation of each of the rotating machines MG1, MG2 such that the MG1 torque Tg requested for the first rotating machine MG1 and the MG2 torque Tm requested for the second rotating machine MG2 are obtained, the battery 54 as an electrical storage device that transmits and receives electric power to the first rotating machine MG1 and the second rotating machine MG2, an electrically driven oil pump 56 (hereinafter, referred to as an EOP 56), and the like. In the power transmission device 16, hydraulic oil (oil) OIL that is used for switching an operation state of the brake B, lubricating the units, such as the planetary gear mechanism 38, cooling the units is supplied by the MOP 40 or the EOP 56.

The brake B is a multi-disc hydraulic frictional engagement device that is engaged and controlled by, for example, a hydraulic actuator. The operation state of the brake B is controlled between engagement (including slip engagement) and release according to the engagement hydraulic pressure supplied from the hydraulic control circuit 50. When the brake B is released, the crankshaft of the engine 12 is brought into a state of being relatively rotatable with respect to the case 18. When the brake B is engaged, the crankshaft of the engine 12 is brought into a state of being relatively nonrotatable with respect to the case 18. That is, the crankshaft of the engine 12 is fixed (locked) to the case 18 by the engagement of the brake B.

The vehicle 10 further includes the electronic control device 90 including a traveling control device that controls the units related to traveling. The electronic control device 90 includes a so-called microcomputer including, for example, a CPU, a RAM, a ROM, an input/output interface, and the like. The CPU executes various kinds of control of the vehicle 10 by performing signal processing according to a program stored in advance in the ROM while using a temporary storage function of the RAM. For example, the electronic control device 90 is configured to execute vehicle control, such as hybrid drive control, relating to the engine 12, the first rotating machine MG1, the second rotating machine MG2, and the like, and includes computers for engine control, rotating machine control, hydraulic pressure control, and the like as necessary.

Various signals and the like (for example, an engine rotation speed Ne, an output rotation speed No as a rotation speed of the drive gear 24 corresponding to a vehicle speed V, an MG1 rotation speed Ng as a rotation speed of the first rotating machine MG1, an MG2 rotation speed Nm as a rotation speed of the second rotating machine MG2, an accelerator operation amount (throttle valve opening degree) θacc as an operation amount of an accelerator pedal representing the magnitude of an acceleration operation (accelerator operation) of a driver, a throttle valve operation degree θth as an opening degree of an electronic throttle valve, an operation position (shift position) POSsh of a shift lever, such as "P", "R", "N", and "D", a front-rear acceleration Gx of the vehicle 10, a right-left acceleration Gy of the vehicle 10, a yaw rate Ryaw as a rotational angular velocity around the vertical axis of the vehicle 10, outside air temperature THair around the vehicle 10, a battery temperature THbat, a battery charging/discharging current Ibat, or a battery voltage Vbat of the battery 54, vehicle periphery information Iard, a GPS signal (orbit signal) Sgps, a communication signal Scom, an automatic driving selection signal Sauto, and the like) based on detection values by various sensors and the like (for example, an engine rotation speed sensor 60, an output rotation speed sensor 62, an MG1 rotation speed sensor 64, such as a resolver, an MG2 rotation speed sensor 66, such as a resolver, an accelerator operation amount sensor 68, a throttle valve opening degree sensor 70, a shift position sensor 72, a G sensor 74, a yaw rate sensor 76, an outside air temperature sensor 78, a battery sensor 79, a course recognition and obstacle detection sensor 80, such as an in-vehicle camera, a GPS antenna 81, an external network communication antenna 82, an automatic driving selection switch 84 that is used when the driver selects automatic driving, and the like) provided in the vehicle 10 are supplied to the electronic control device 90. Various command signals (for example, an engine control command signal Se for controlling the engine 12, a hydraulic control command signal Sp for controlling the brake B, a rotating machine control command signal Sm for operating the inverter 52 controlling the rotating machines MG1, MG2, an EOP control command signal Sop for controlling the EOP 56, a command signal Scom, a steering signal Sste for operating a steering actuator 86 controlling steering of wheels (in particular, front wheels), a braking signal Sbra for operating a brake actuator 88 controlling a foot brake, and the like) are output from the electronic control device 90 to the devices (for example, the engine 12, the hydraulic control circuit 50, the inverter 52, the EOP 56, the external network communication antenna 82, the steering actuator 86, the brake actuator 88, and the like) provided in the vehicle 10. The electronic control device 90 calculates a charging state (state of charge) SOC of the battery 54 based on, for example, a battery charging/discharging current Ibat, the battery voltage Vbat, and the like.

In order to realize a control function for various kinds of control in the vehicle 10, the electronic control device 90 includes traveling mode switching control means, that is, a traveling mode switching control unit 92, and driving control means, that is, a driving control unit 94.

The traveling mode switching control unit 92 outputs the engine control command signal Se for controlling the on/off of the electronic throttle valve, controlling the fuel injection amount or an injection timing, and controlling the ignition timing to execute output control of the engine 12 such that a target value of the engine torque Te is obtained. The traveling mode switching control unit 92 outputs the rotating machine control command signal Sm for controlling operation of the first rotating machine MG1 or the second rotating machine MG2 to the inverter 52 to execute output control of the first rotating machine MG1 or the second rotating machine MG2 such that a target value of the MG1 torque Tg or the MG2 torque Tm is obtained.

Specifically, the traveling mode switching control unit 92 calculates drive torque (requested drive torque) requested at the vehicle speed V at this time from the accelerator operation amount (throttle valve opening degree) θacc, and generates the requested drive torque from at least one of the engine 12, the first rotating machine MG1, or the second rotating machine MG2 such that driving with high fuel efficiency and a small amount of exhaust gas is performed in consideration of a requested charging value (requested charging power) or the like. That is, the traveling mode switching control unit 92 switches among a plurality of traveling modes using different drive power sources as a drive torque source according to a traveling state.

The traveling mode switching control unit 92 selectively establishes a motor traveling (referred to as EV traveling) mode and a hybrid traveling (referred to as HV traveling) mode as the traveling modes according to the traveling state. For example, the traveling mode switching control unit 92 establishes the EV traveling mode in a case where the requested drive torque is in a motor traveling region smaller than a threshold obtained and stored experimentally or in design in advance (that is, determined in advance), and establishes the HV traveling mode in a case where the requested drive torque is in a hybrid traveling region equal to or greater than the threshold determined in advance. The traveling mode switching control unit 92 establishes the HV traveling mode in a case where the state of charge SOC becomes less than a threshold determined in advance even when the requested drive torque is in the motor traveling region.

When the EV traveling mode is established, the traveling mode switching control unit 92 stops the operation of the engine 12 and enables motor traveling (EV traveling) in which at least one rotating machine (in particular, the second rotating machine MG2) of the first rotating machine MG1 or the second rotating machine MG2 is used as the drive torque source. When the EV traveling mode is established, in a case where the requested drive torque is covered exclusively by the second rotating machine MG2, the traveling mode switching control unit 92 established a single-drive EV traveling mode. In a case where the requested drive torque is not covered exclusively by the second rotating machine MG2, the traveling mode switching control unit 92 establishes a dual-drive EV traveling mode. In a case where the single-drive EV traveling mode is established, the traveling mode switching control unit 92 enables EV traveling in which the second rotating machine MG2 is exclusively used as the drive torque source. In a case where the dual-drive EV traveling mode is established, the traveling mode switching control unit 92 enables EV traveling in which both of the first rotating machine MG1 and the second rotating machine MG2 are used as the drive torque source. In this way, in the dual-drive EV traveling mode, the traveling mode switching control unit 92 executes dual-drive of the two rotating machines in which both of the first rotating machine MG1 and the second rotating machine MG2 are operated to enable EV traveling. Even when the requested drive torque is covered exclusively by the second rotating machine MG2, in a case where an operation point (operating point) of the second rotating machine MG2 represented by the MG2 rotation speed Nm and the MG2 torque Tm is within an area determined in advance as an operation point where the efficiency of the second rotating machine MG2 is deteriorated (in other words, in a case where it is efficient that the first rotating machine MG1 and the second rotating machine MG2 are used together), the traveling mode switching control unit 92 establishes the dual-drive EV traveling mode. In a case where the dual-drive EV traveling mode is established, the traveling mode switching control unit 92 makes the first rotating machine MG1 and the second rotating machine MG2 share the requested drive torque based on the operating efficiency of the first rotating machine MG1 and the second rotating machine MG2.

In a case where the HV traveling mode is established, the traveling mode switching control unit 92 bears reaction force to the power of the engine 12 with electric power generation of the first rotating machine MG1 to transmit the directly transmitted engine torque to the drive gear 24. The second rotating machine MG2 is driven with generated electric power of the first rotating machine MG1 to transmit torque to the drive wheels 14, thereby enabling HV traveling (referred to as engine traveling) in which at least the engine 12 is used as the drive torque source. That is, in a case where the HV traveling mode is established, the traveling mode switching control unit 92 controls the operating state of the first rotating machine MG1, thereby enabling HV traveling in which traveling is performed by transmitting the power of the engine 12 to the drive wheels 14. In the HV traveling mode, traveling may be performed by further adding drive torque of the second rotating machine MG2 using electric power from the battery 54.

The traveling mode switching control unit 92 outputs the hydraulic control command signal Sp for controlling operation of the brake B to the hydraulic control circuit 50 based on the established traveling mode. Specifically, the traveling mode switching control unit 92 controls the engagement hydraulic pressure supplied from the hydraulic control circuit 50 to the hydraulic actuator of the brake B, thereby performing the engagement or release of the brake B. That is, the traveling mode switching control unit 92 controls fixing or unfixing of the crankshaft of the engine 12 with respect to the case 18. In a case where the dual-drive EV traveling mode is established in the EV traveling mode, the traveling mode switching control unit 92 increases the engagement hydraulic pressure to engage the brake B, thereby fixing the crankshaft of the engine 12 with respect to the case 18. In a case where the HV traveling mode is established or the single-drive EV traveling mode is established in the EV traveling mode, the traveling mode switching control unit 92 decreases the engagement hydraulic pressure to release the brake B. With this, the traveling mode switching control unit 92 unfixes the crankshaft of the engine 12 from the case 18.

The traveling mode switching control unit 92 outputs the EOP control command signal Sop for controlling operation of the EOP 56 to the EOP 56. Specifically, in the dual-drive EV traveling mode, the rotation of the engine 12 is stopped and the supply of oil OIL by the MOP 40 is stopped. For this reason, in a case where the dual-drive EV traveling mode is established in the EV traveling mode, the traveling mode switching control unit 92 operates the EOP 56. That is, while dual-drive of the rotating machines MG1, MG2 is being executed, the traveling mode switching control unit 92 operates the EOP 56.

At the time of switching from the EV traveling mode to the HV traveling mode, the traveling mode switching control unit 92 starts the engine 12 by increasing the engine rotation speed Ne with the first rotating machine MG1 and performing ignition in the release state of the brake B. At the time of switching from the HV traveling mode to the EV traveling mode, the traveling mode switching control unit 92 stops the operation of the engine 12 by stopping fuel supply to the engine 12.

Figure 2:
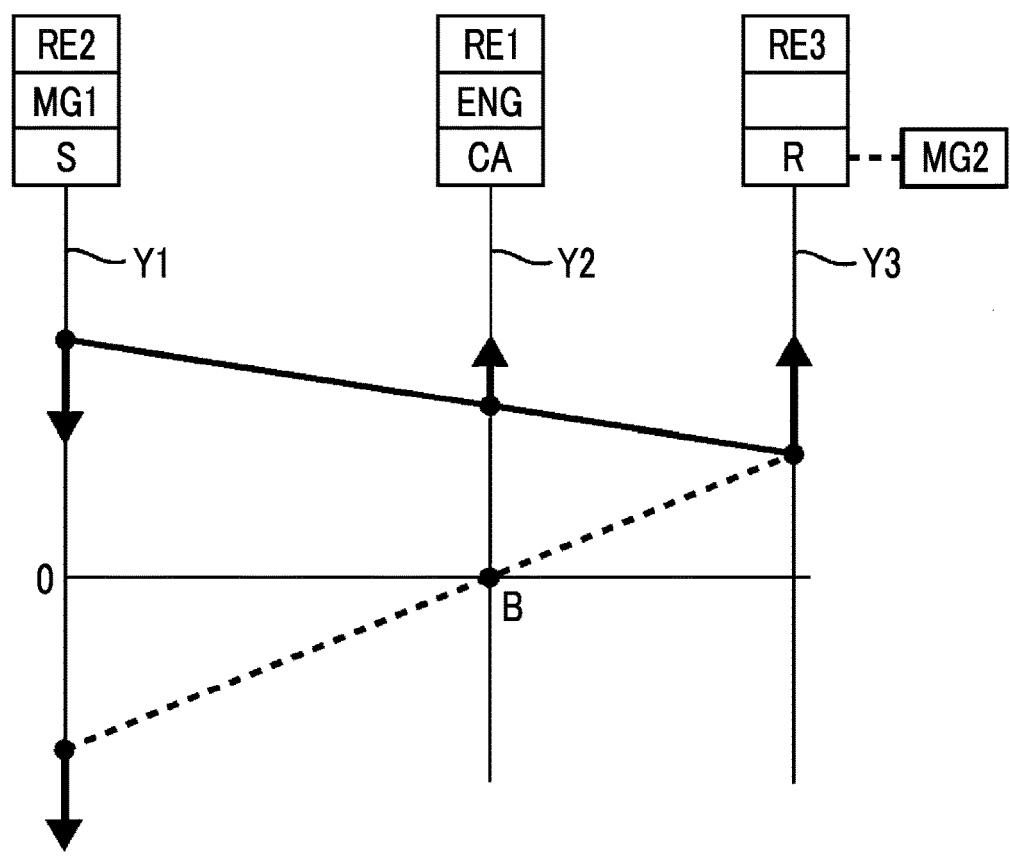
FIG. 2 is a collinear diagram capable of relatively representing rotation speeds of rotating elements in a planetary gear mechanism, a solid line indicating an example of a traveling state in an HV traveling mode, and a broken line indicating an example of a traveling state in an EV traveling mode.

FIG. 2 is a collinear diagram capable of relatively representing rotation speeds of three rotating elements RE1, RE2, RE3 in the planetary gear mechanism 38. In the collinear diagram, a vertical line Y1 indicates the rotation speed of the sun gear S that is the second rotating element RE2 coupled to the first rotating machine MG1, a vertical line Y2 indicates the rotation speed of the carrier CA that is the first rotating element RE1 coupled to the engine (ENG) 12, and a vertical line Y3 indicates the rotation speed of the ring gear R that is the third rotating element RE3 rotating integrally with the drive gear 24. The second rotating machine MG2 is coupled to the third rotating element RE3 through the driven gear 26, the reduction gear 34, and the like. A solid line of FIG. 2 indicates an example of a relative speed of each rotating element in a traveling state in the HV traveling mode, and a broken line of FIG. 2 indicates an example of a relative speed of each rotating element in a traveling state in the EV traveling mode.

Operation of the vehicle 10 in the HV traveling mode will be described using the solid line of FIG. 2. In this state, the brake B is released, and the crankshaft of the engine 12 is not fixed to the case 18. In contrast with the engine torque Te input to the carrier CA, the MG1 torque Tg is input to the sun gear S. At this time, for example, control for setting the operation point of the engine 12 represented by the engine rotation speed Ne and the engine torque Te to an operation point where fuel efficiency is highest can be executed by powering control or reaction control of the first rotating machine MG1. This kind of hybrid format is referred to a mechanical split type or a split type.

Operation of the vehicle 10 in the single-drive EV traveling mode in the EV traveling mode will be described using the broken line of FIG. 2. The engine 12 is not driven (that is, the engine 12 is brought into an operation stop state), the first rotating machine MG1 is brought into a no-load state (free), and the engine rotation speed Ne becomes zero. In the single-drive EV traveling mode, the brake B is released, and the crankshaft of the engine 12 is not fixed to the case 18. In this state, powering torque of the second rotating machine MG2 is transmitted to the drive wheels 14 as drive power in a vehicle forward movement direction.

Operation of the vehicle 10 in the dual-drive EV traveling mode in the EV traveling mode will be described using the broken line of FIG. 2. The engine 12 is not driven, and the engine rotation speed Ne becomes zero. In the dual-drive EV traveling mode, the brake B is engaged so as to fix the crankshaft of the engine 12 to the case 18 with the traveling mode switching control unit 92. Accordingly, the engine 12 is fixed (locked) to be nonrotatable. In a state in which the brake B is engaged, powering torque of the second rotating machine MG2 is transmitted to the drive wheels 14 as drive power in the vehicle forward movement direction. Reaction torque of the first rotating machine MG1 is transmitted to the drive wheels 14 as drive power in the vehicle forward movement direction. In this way, in the vehicle 10, the crankshaft of the engine 12 is locked by the brake B, whereby the first rotating machine MG1 and the second rotating machine MG2 can be used together as a drive torque source. With this, for example, in a so-called plug-in hybrid vehicle or the like, in a case where the battery 54 increases in capacity (increases in power), it is possible to realize high-power motor traveling while suppressing an increase in size of the second rotating machine MG2.

The driving control unit 94 switches between automatic driving by automatic driving control and manual driving by a driving operation from a driver. The manual driving is a driving method in which traveling of the vehicle 10 is performed by the driving operation from the driver, such as an accelerator operation, a brake operation, or a steering operation. The automatic driving is a driving method in which traveling of the vehicle 10 is performed by automatically performing acceleration/deceleration, braking, steering, or the like through the control of the electronic control device 90 based on the signals, information, and the like from various sensors without depending on a driving operation from a driver (intention of the driver).

Specifically, the driving control unit 94 executes the manual driving in a case where automatic driving is not selected in an automatic driving selection switch 84. The driving control unit 94 executes the automatic driving in a case where the automatic driving selection switch 84 is operated by the driver and the automatic driving is selected.

The driving control unit 94 performs switching to the manual driving in a case where determination is made that the driving operation from the driver, such as an accelerator operation, a brake operation, or a steering operation, is performed during the automatic driving. The driving control unit 94 performs switching to the manual driving in a case where determination is made that an emergency requirement occurs during the automatic driving. The emergency requirement is a situation in which the automatic driving is unable to be performed safely due to an abnormality in communication necessary for the automatic driving, such as hacking (unauthorized access to the electronic control device 90 through a communication line) or a transmission/reception error of a communication signal Scom. The driving control unit 94 performs switching to the manual driving in a case where determination is made that the execution of the automatic driving is impossible based on a road situation during the automatic driving. The driving control unit 94 performs switching to the automatic driving in a case where determination is made that return to the automatic driving is possible based on a road situation when switching to the manual driving is temporarily performed based on a road situation during the automatic driving. The driving control unit 94 inhibits switching to the automatic driving and maintains the manual driving in a case where the automatic driving selection switch 84 is operated by the driver and the automatic driving is selected in a state in which determination is made that an emergency requirement occurs during the manual driving.

The driving control unit 94 controls the engine 12 or the rotating machines MG1, MG2 based on the signals, information, or the like from various sensors and operates the steering actuator 86 or the brake actuator 88 to perform the automatic driving.

On the other hand, in the automatic driving, for example, the operation of the vehicle 10 is performed through control corresponding to peripheral situations of the vehicle 10. In the manual driving, for example, the operation of the vehicle 10 is performed through control in consideration of an operation of the driver. For this reason, it is considered that control at the time of switching of the traveling modes is performed through control for the automatic driving during the automatic driving, and is performed through control for the manual driving during the manual driving. For example, during the automatic driving, change in torque generated in the drive torque source switched in operation at the time of switching of the traveling modes is made comparatively small, thereby performing control focusing on suppression of a shock caused by switching of the drive torque source. During the manual driving, change in torque generated in the drive torque source switched in operation at the time of switching of the traveling modes is made comparatively large, thereby performing control focusing on switching responsiveness of the drive torque source according to a driver's acceleration intention or deceleration intention. In a case of performing such control, when switching of the traveling modes is performed, in a case where switching between the automatic driving and the manual driving is made, the control (for example, control of torque of the drive torque source, and consequently, control of drive torque) at the time of switching of the traveling modes is likely to be switched between the control for the automatic driving and the control for the manual driving and discontinuous, and as a result, there is a concern that a shock occurs.

Accordingly, in order to prevent a shock caused by switching between the automatic driving and the manual driving at the time of switching of the traveling modes, the driving control unit 94 functionally includes a switching inhibition unit 96 that inhibits switching between the automatic driving and the manual driving until switching of the traveling modes is completed after switching of the traveling modes starts.

The electronic control device 90 further includes traveling state determination means, that is, a traveling state determination unit 98 in order to realize control for preventing a shock caused by switching the automatic driving and the manual driving at the time of switching of the traveling modes.

The traveling state determination unit 98 determines whether or not it is the time at which switching between the automatic driving and the manual driving is performed, that is, whether or not there is a request switching between the automatic driving and the manual driving. Switching between the automatic driving and the manual driving is switching from the automatic driving to the manual driving or switching from the manual driving to the automatic driving. That is, the request for switching between the automatic driving and the manual driving is a request from switching from the automatic driving to the manual driving or a request for switching from the manual driving to the automatic driving.

The traveling state determination unit 98 determines whether or not it is the time when switching of the traveling modes is performed, that is, whether or not there is a request for switching of the traveling modes. The time of switching of the traveling modes is, for example, the time of switching from the EV traveling mode to the HV traveling mode. That is, the request for switching of the traveling modes is, for example, a request for switching from the EV traveling mode to the HV traveling mode.

When it is the time when switching from the EV traveling mode to the HV traveling mode is performed (that is, when there is a request for switching from the EV traveling mode to the HV traveling mode), the engine 12 is started and the engine torque Te is raised. For this reason, completion of switching from the EV traveling mode to the HV traveling mode may be determined according to whether or not the engine torque Te of the engine 12 is brought into a stable state (a self-sustaining operation of the engine 12 is enabled), for example. The traveling state determination unit 98 may determine whether or not the self-sustaining operation of the engine 12 is enabled. For example, the traveling state determination unit 98 may determine whether or not the self-sustaining operation of the engine 12 is enabled based on whether or not the engine torque Te reaches a target value. The traveling state determination unit 98 may determine whether or not the self-sustaining operation of the engine 12 is enabled based on an elapsed time from the start of switching from the EV traveling mode to the HV traveling mode is equal to or longer than a predetermined time determined in advance for determining that the self-sustaining operation of the engine 12 is enabled.

The switching inhibition unit 96 inhibits switching between the automatic driving and the manual driving in a case where the traveling state determination unit 98 determines that the self-sustaining operation of the engine 12 is not enabled when the traveling state determination unit 98 determines that there is the request for switching between the automatic driving and the manual driving and the traveling state determination unit 98 determines that there is the request for switching from the EV traveling mode to the HV traveling mode. That is, the switching inhibition unit 96 inhibits switching between the automatic driving and the manual driving until the traveling state determination unit 98 determines that the self-sustaining operation of the engine 12 is enabled in a case where the traveling state determination unit 98 determines that there is the request for switching from the EV traveling mode to the HV traveling mode when the traveling state determination unit 98 determines that there is the request for switching between the automatic driving and the manual driving. The driving control unit 94 executes switching between the automatic driving and the manual driving in a case where the traveling state determination unit 98 determines that the self-sustaining operation of the engine 12 is enabled when the traveling state determination unit 98 determines that there is the request for switching between the automatic driving and the manual driving and the traveling state determination unit 98 determines that there is the request for switching from the EV traveling mode to the HV traveling mode. The driving control unit 94 executes switching between the automatic driving and the manual driving in a case where the traveling state determination unit 98 determines that there is no request for switching from the EV traveling mode to the HV traveling mode when the traveling state determination unit 98 determines that there is the request for switching between the automatic driving and the manual driving.

Figure 3:
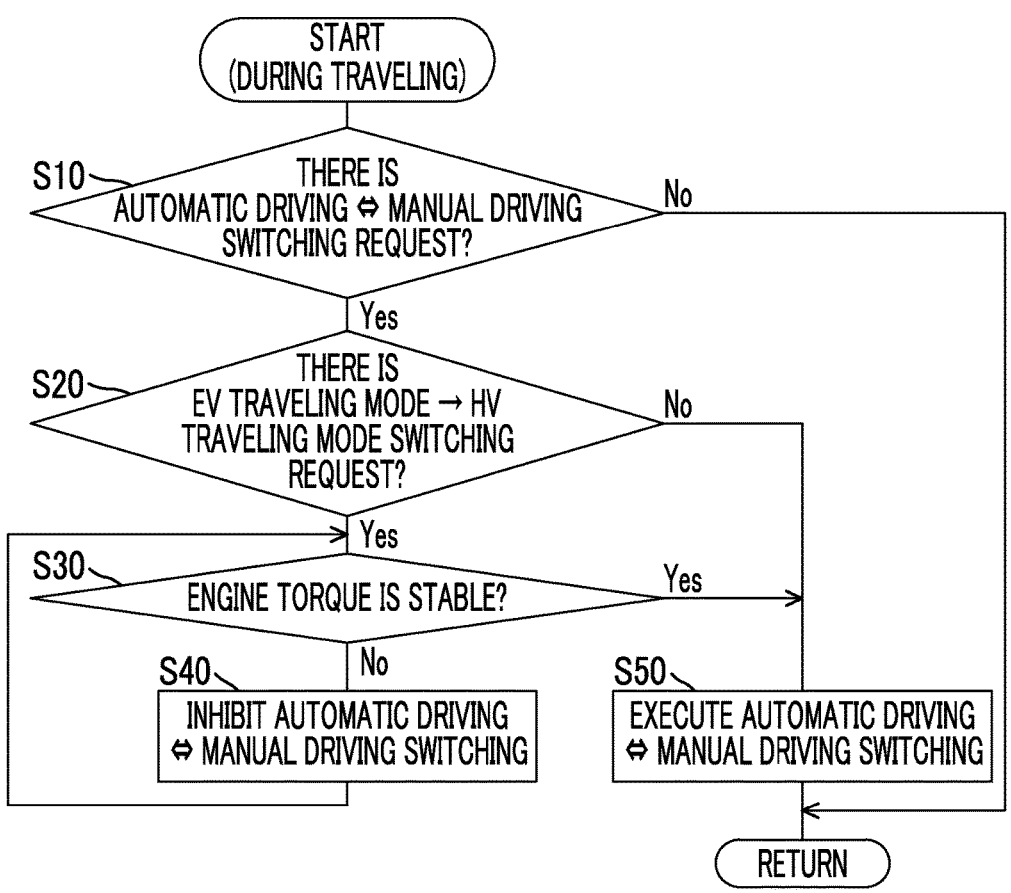
FIG. 3 is a flowchart illustrating a main part of control operation of an electronic control device, that is, control operation for preventing a shock caused by switching between automatic driving and manual driving at the time of switching of traveling modes.

FIG. 3 is a flowchart illustrating a main part of control operation of the electronic control device 90, that is, control operation for preventing a shock caused by switching between automatic driving and manual driving at the time of switching of traveling modes, and the flowchart is repeatedly executed during traveling, for example.

In FIG. 3, first, in Step (hereinafter, Step will be omitted) S10 corresponding to the function of the traveling state determination unit 98, determination is made whether or not there is the request for switching between the automatic driving and the manual driving. In a case where the determination of S10 is negative, the routine ends. In a case where the determination of S10 is affirmative, in S20 corresponding to the function of the traveling state determination unit 98, determination is made whether or not there is the request for switching from the EV traveling mode to the HV traveling mode. In a case where the determination of S20 is affirmative, in S30 corresponding to the function of the traveling state determination unit 98, determination is made whether or not the self-sustaining operation of the engine 12 is enabled. In a case where the determination of S30 is negative, in S40 corresponding to the function of the switching inhibition unit 96, switching between the automatic driving and the manual driving is inhibited. Next to S40, S30 is executed. In a case where the determination of S20 is negative or in a case where the determination of S30 is affirmative, in S50 corresponding to the function of the driving control unit 94, switching between the automatic driving and the manual driving is executed.

As described above, with this example, switching between the automatic driving and the manual driving is inhibited until switching of the traveling modes is completed after switching of the traveling modes starts. Accordingly, the control at the time of switching of the traveling modes is avoided from being switched between the control for the automatic driving and the control for the manual driving, and discontinuity of the control at the time of switching of the traveling modes does not occur. Therefore, it is possible to prevent a shock caused by switching between the automatic driving and the manual driving at the time of switching of the traveling modes.

With this example, since switching between the automatic driving and the manual driving is inhibited until the self-sustaining operation of the engine 12 is enabled at the time of switching from the EV traveling mode to the HV traveling mode, control at the time of switching from the EV traveling mode to the HV traveling mode is avoided from being switched between the control for the automatic driving and the control for the manual driving, and discontinuity of the control at the time of switching of the traveling modes does not occur.

Embodiment 2

Next, another embodiment of the disclosure will be described. In the following description, portions common to the embodiments are represented by the same reference numerals, and description thereof will not be repeated.

In Embodiment 1 described above, a case where the time of switching of the traveling modes is the time of switching from the EV traveling mode to the HV traveling mode has been illustrated. In this embodiment, a case where the time of switching of the traveling modes is the time of switching from the HV traveling mode to the EV traveling mode is illustrated. That is, a case where the request for switching of the traveling modes is a request for switching from the HV traveling mode to the EV traveling mode is illustrated.

At the time of switching from the HV traveling mode to the EV traveling mode (that is, when there is the request for switching from the HV traveling mode to the EV traveling mode), the operation of the engine 12 is stopped and the engine torque Te decreases to zero. At this time, the engine rotation speed Ne decreases to zero. For this reason, completion of switching from the HV traveling mode to the EV traveling mode may be determined according to completion of a stop of the engine 12 (that is, completion of rotation stop), for example. The traveling state determination unit 98 may determine whether or not the stop of the engine 12 is completed. For example, the traveling state determination unit 98 may determine whether or not the stop of the engine 12 is completed based on whether or not the engine rotation speed Ne is less than a predetermined rotation speed determined in advance capable of determining that the engine 12 is stopped. The traveling state determination unit 98 may determine whether or not the stop of engine 12 is completed based on whether or not an elapsed time from the start of switching from the HV traveling mode to the EV traveling mode is equal to or longer than a predetermined stop time determined in advance for determining that the stop of the engine 12 is completed.

The switching inhibition unit 96 inhibits switching between the automatic driving and the manual driving in a case where the traveling state determination unit 98 determines that the stop of the engine 12 is not completed when the traveling state determination unit 98 determines that there is the request for switching between the automatic driving and the manual driving and the traveling state determination unit 98 determines that there is the request for switching from the HV traveling mode to the EV traveling mode. That is, the switching inhibition unit 96 inhibits switching between the automatic driving and the manual driving until the traveling state determination unit 98 determines that the stop of the engine 12 is completed in a case where the traveling state determination unit 98 determines that there is the request for switching from the HV traveling mode to the EV traveling mode when the traveling state determination unit 98 determines that there is the request for switching between the automatic driving and the manual driving. The driving control unit 94 executes switching between the automatic driving and the manual driving in a case where the traveling state determination unit 98 determines that the stop of the engine 12 is completed when the traveling state determination unit 98 determines that there is the request for switching between the automatic driving and the manual driving and the traveling state determination unit 98 determines that there is the request for switching from the HV traveling mode to the EV traveling mode. The driving control unit 94 executes switching between the automatic driving and the manual driving in a case where the traveling state determination unit 98 determines that there is no request for switching from the HV traveling mode to the EV traveling mode when the traveling state determination unit 98 determines that there is the request for switching between the automatic driving and the manual driving.

Figure 4:
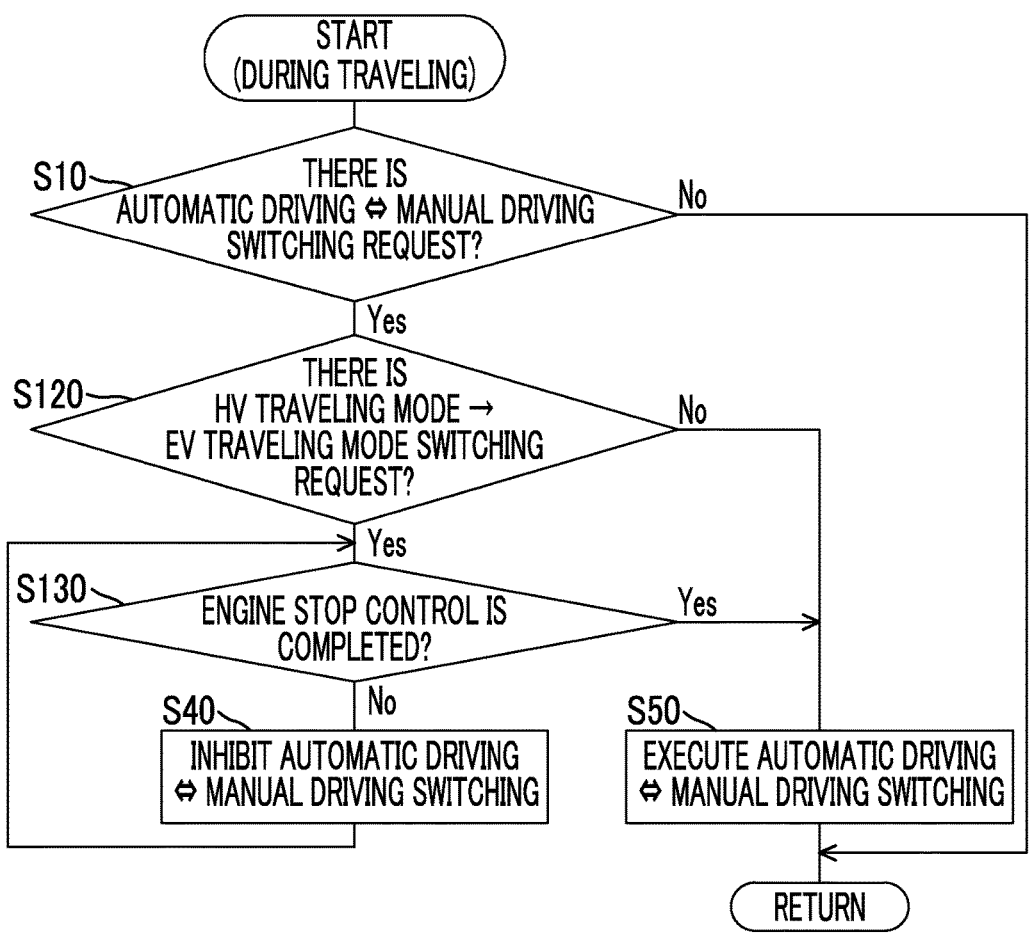
FIG. 4 is a flowchart illustrating a main part of control operation of an electronic control device, that is, control operation for preventing a shock caused by switching between automatic driving and manual driving at the time of switching of traveling modes, and shows an embodiment different from FIG. 3.

FIG. 4 is a flowchart illustrating a main part of control operation of the electronic control device 90, that is, control operation for preventing a shock caused by switching between automatic driving and manual driving at the time of switching of traveling modes, and the flowchart is repeatedly executed during traveling, for example. FIG. 4 shows an embodiment different from FIG. 3.

The flowchart of FIG. 4 is different from the flowchart of FIG. 3 primarily in that the steps of S20 and S30 of FIG. 3 are substituted with steps of S120 and S130, respectively. The difference will be primarily described. In FIG. 4, in a case where the determination of S10 is affirmative, in S120 corresponding to the function of the traveling state determination unit 98, determination is made whether or not there is the request for switching from the HV traveling mode to the EV traveling mode. In a case where the determination of S120 is affirmative, in S130 corresponding to the function of the traveling state determination unit 98, determination is made whether or not the stop (stop control has the same meaning) of the engine 12 is completed. In a case where the determination of S130 is negative, S40 is executed. Next to S40, S130 is executed. In a case where the determination of S120 is negative or in a case where the determination of S130 is affirmative, S50 is executed.

As described above, with this embodiment, switching between the automatic driving and the manual driving is inhibited until the stop of the engine 12 is completed at the time of switching from the HV traveling mode to the EV traveling mode.

Accordingly, control at the time of switching from the HV traveling mode to the EV traveling mode is avoided from being switched between the control for the automatic driving and the control for the manual driving, and discontinuity of the control at the time of switching of the traveling modes does not occur. Therefore, as in Embodiment 1 described above, it is possible to prevent a shock caused by switching between automatic driving and manual driving at the time of switching of the traveling modes.

Embodiment 3

In Embodiment 2 described above, a case where the time of switching of the traveling modes is the time of switching from the HV traveling mode to the EV traveling mode has been illustrated. The EV traveling mode includes the single-drive EV traveling mode and the dual-drive EV traveling mode. In this embodiment, the dual-drive EV traveling mode in which the brake B is to be engaged at the time of switching to the EV traveling mode is considered. That is, in this embodiment, a case where the time of switching of the traveling modes is the time of switching from the HV traveling mode to the dual-drive EV traveling mode is illustrated. That is, a case where the request for switching of the traveling modes is a request for switching from the HV traveling mode to the dual-drive EV traveling mode is illustrated.

In the dual-drive EV traveling mode, in a state in which the rotation of the engine 12 is stopped and the brake B is engaged, the power of the first rotating machine MG1 is transmitted to the drive wheels 14 as drive power. Accordingly, at the time of switching from the HV traveling mode to the dual-drive EV traveling mode (that is, when there is the request for switching from the HV traveling mode to the dual-drive EV traveling mode), after the rotation of the engine 12 is stopped, and in addition, the brake B is switched to the engagement state, the dual-drive of the first rotating machine MG1 and the second rotating machine MG2 is performed. For this reason, completion of switching from the HV traveling mode to the dual-drive EV traveling mode may be determined according to completion of the stop of the engine 12 and transition completion (switching completion has the same meaning) to the dual-drive of the first rotating machine MG1 and the second rotating machine MG2, for example. The traveling state determination unit 98 may determine whether or not the stop of the engine 12 is completed. In addition, the traveling state determination unit 98 may determine whether or not transition (switching has the same meaning) to the dual-drive of the first rotating machine MG1 and the second rotating machine MG2 is completed. For example, the traveling state determination unit 98 may determine whether or not transition to the dual-drive of the first rotating machine MG1 and the second rotating machine MG2 is completed based on whether or not the MG1 torque Tg and the MG2 torque Tm (or the rotating machine control command signals Sm to the first rotating machine MG1 and the second rotating machine MG2) reach the target values. The traveling state determination unit 98 may determine whether or not transition to the dual-drive of the first rotating machine MG1 and the second rotating machine MG2 is completed based on whether or not an elapsed time from the start of engagement of the brake B is equal to or longer than a predetermined transition completion time determined in advance for determining completion of transition to the dual-drive of the first rotating machine MG1 and the second rotating machine MG2.

The switching inhibition unit 96 inhibits switching between the automatic driving and the manual driving in a case where the traveling state determination unit 98 determines that the stop of the engine 12 is not completed or in a case where the traveling state determination unit 98 determines that transition to the dual-drive of the first rotating machine MG1 and the second rotating machine MG2 is not completed when the traveling state determination unit 98 determines that there is the request for switching between the automatic driving and the manual driving and the traveling state determination unit 98 determines that there is the request for switching from the HV traveling mode to the dual-drive EV traveling mode. That is, the switching inhibition unit 96 inhibits switching between the automatic driving and the manual driving until the traveling state determination unit 98 determines that the stop of the engine 12 is completed and the traveling state determination unit 98 determines that transition to the dual-drive of the first rotating machine MG1 and the second rotating machine MG2 is completed in a case where the traveling state determination unit 98 determines that there is the request for switching from the HV traveling mode to the dual-drive EV traveling mode when the traveling state determination unit 98 determines that there is the request for switching between the automatic driving and the manual driving. The driving control unit 94 executes switching between the automatic driving and the manual driving in a case where the traveling state determination unit 98 determines that the stop of the engine 12 is completed and the traveling state determination unit 98 determines that transition to the dual-drive of the first rotating machine MG1 and the second rotating machine MG2 is completed when the traveling state determination unit 98 determines that there is the request for switching between the automatic driving and the manual driving and the traveling state determination unit 98 determines that there is the request for switching from the HV traveling mode to the dual-drive EV traveling mode. The driving control unit 94 executes switching between the automatic driving and the manual driving in a case where the traveling state determination unit 98 determines that there is no request for switching from the HV traveling mode to the dual-drive EV traveling mode when the traveling state determination unit 98 determines that there is the request for switching between the automatic driving and the manual driving.

Figure 5:
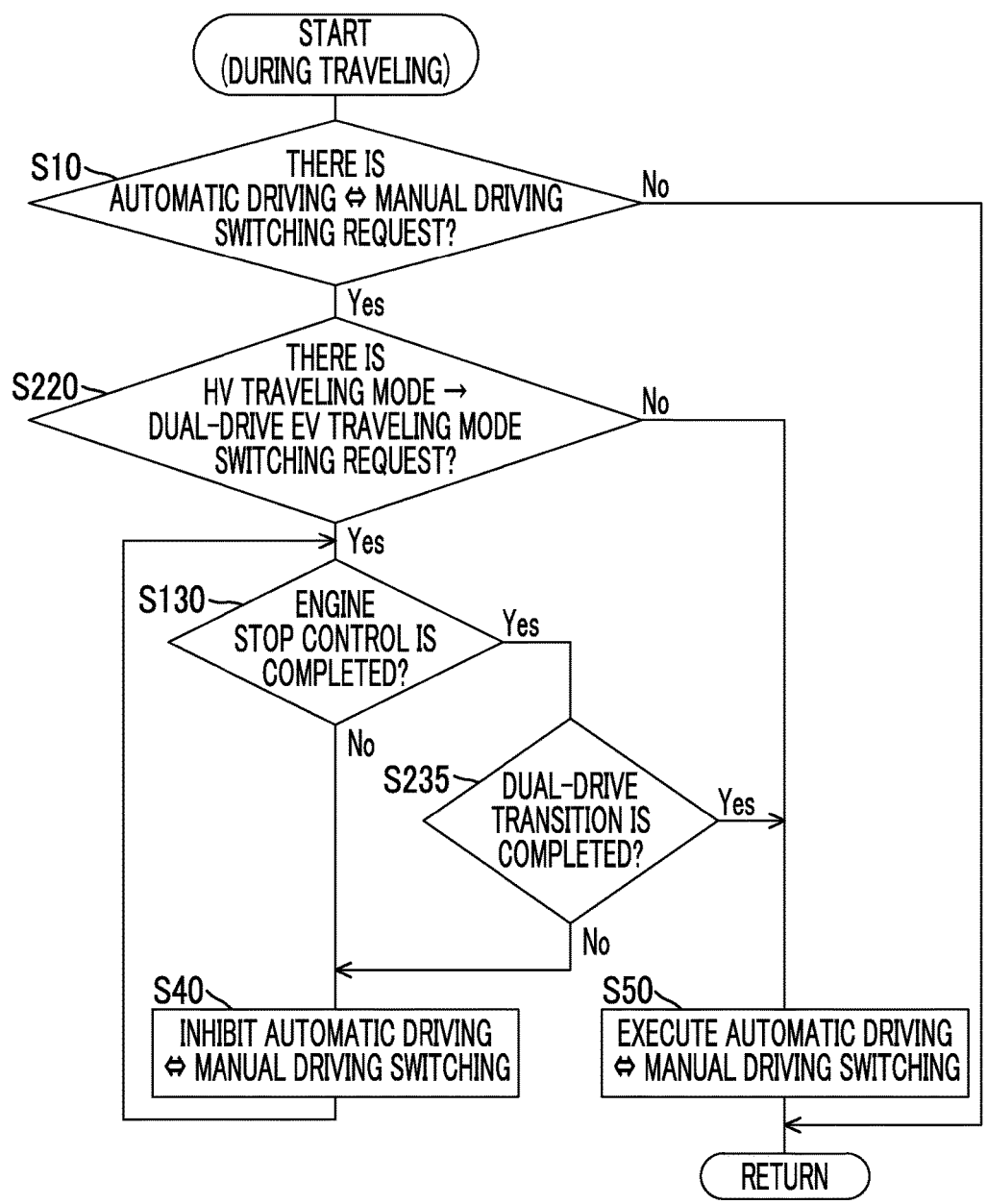
FIG. 5 is a flowchart illustrating a main part of control operation of an electronic control device, that is, control operation for preventing a shock caused by switching between automatic driving and manual driving at the time of switching of traveling modes, and shows an embodiment different from FIG. 4.

FIG. 5 is a flowchart illustrating a main part of control operation of the electronic control device 90, that is, control operation for preventing a shock caused by switching between automatic driving and manual driving at the time of switching of traveling modes, and the flowchart is repeatedly executed during traveling, for example. FIG. 5 shows an embodiment different from FIG. 4.

The flowchart of FIG. 5 is different from the flowchart of FIG. 4 primarily in that the step of S120 of FIG. 4 is substituted with a step of S220 and a step of S235 is added. The difference will be primarily described. In FIG. 5, in a case where the determination of S10 is affirmative, in S220 corresponding to the function of the traveling state determination unit 98, determination is made whether or not there is the request for switching from the HV traveling mode to the dual-drive EV traveling mode. In a case where the determination of S220 is affirmative, S130 is executed. In a case where the determination of S130 is affirmative, in S235 corresponding to the function of the traveling state determination unit 98, determination is made whether or not transition to the dual-drive of the first rotating machine MG1 and the second rotating machine MG2 is completed. In a case where the determination of S130 is negative or in a case where the determination of S235 is negative, S40 is executed. Next to S40, S130 is executed. In a case where the determination of S220 is negative or in a case where the determination of S235 is affirmative, S50 is executed.

As described above, with this embodiment, since switching between the automatic driving and the manual driving is inhibited until completion of the stop of the engine 12 and completion of transition to the dual-drive of the first rotating machine MG1 and the second rotating machine MG2 at the time of switching from the HV traveling mode to the dual-drive EV traveling mode. Accordingly, control at the time of switching from the HV traveling mode to the dual-drive EV traveling mode is avoided from being switched between the control for the automatic driving and the control for the manual driving, and discontinuity of the control at the time of switching of the traveling modes does not occur. Therefore, as in Embodiments 1 and 2 described above, it is possible to prevent a shock caused by switching between automatic driving and manual driving at the time of switching of the traveling modes.

Embodiment 4

In Embodiments 1 to 3 described above, a case where the time of switching of the traveling modes is the time of switching between the EV traveling mode and the HV traveling mode has been illustrated. In this embodiment, a case where the time of switching of the traveling modes is the time of switching between the single-drive EV traveling mode and the dual-drive EV traveling mode is illustrated. That is, a case where the request for switching of the traveling modes is a request for switching between the single-drive EV traveling mode and the dual-drive EV traveling mode is illustrated.

At the time of switching between the single-drive EV traveling mode and the dual-drive EV traveling mode (that is, when there is the request for switching between the single-drive EV traveling mode and the dual-drive EV traveling mode), the operation state of the first rotating machine MG1 is switched (that is, the first rotating machine MG1 is switched between an operation stop state and a drive state). For this reason, completion of switching between the single-drive EV traveling mode and the dual-drive EV traveling mode may be determined according to completion of switching of the operation state of the first rotating machine MG1, for example. The traveling state determination unit 98 may determine whether or not switching of the operation state of the first rotating machine MG1 is completed.

The switching inhibition unit 96 inhibits switching between the automatic driving and the manual driving in a case where the traveling state determination unit 98 determines that switching of the operation state of the first rotating machine MG1 is not completed when the traveling state determination unit 98 determines that there is the request for switching between the automatic driving and the manual driving and the traveling state determination unit 98 determines that there is the request for switching between the single-drive EV traveling mode and the dual-drive EV traveling mode. That is, the switching inhibition unit 96 inhibits switching between the automatic driving and the manual driving until the traveling state determination unit 98 determines that switching of the operation state of the first rotating machine MG1 is completed in a case where the traveling state determination unit 98 determines that there is the request for switching between the single-drive EV traveling mode and the dual-drive EV traveling mode when the traveling state determination unit 98 determines that there is the request for switching between the automatic driving and the manual driving. The driving control unit 94 executes switching between the automatic driving and the manual driving in a case where the traveling state determination unit 98 determines that switching of the operation state of the first rotating machine MG1 is completed when the traveling state determination unit 98 determines that there is the request for switching between the automatic driving and the manual driving and the traveling state determination unit 98 determines that there is the request for switching between the single-drive EV traveling mode and the dual-drive EV traveling mode. The driving control unit 94 executes switching between the automatic driving and the manual driving in a case where the traveling state determination unit 98 determines that there is no request for switching between the single-drive EV traveling mode and the dual-drive EV traveling mode when the traveling state determination unit 98 determines that there is the request for switching between the automatic driving and the manual driving.

Here, a case where the time of switching between the single-drive EV traveling mode and the dual-drive EV traveling mode is the time of switching from the single-drive EV traveling mode to the dual-drive EV traveling mode will be described below in detail.

At the time of switching from the single-drive EV traveling mode to the dual-drive EV traveling mode (that is, when there is request for switching from the single-drive EV traveling mode to the dual-drive EV traveling mode), the first rotating machine MG1 in the operation stop state is driven and the MG1 torque Tg is raised. For this reason, completion of switching from the single-drive EV traveling mode to the dual-drive EV traveling mode may be determined according to completion of switching of the first rotating machine MG1 to the drive state, for example. The traveling state determination unit 98 determines whether or not switching of the first rotating machine MG1 to the drive state is completed. For example, the traveling state determination unit 98 may determine whether or not switching of the first rotating machine MG1 to the drive state is completed based on whether or not the MG1 torque Tg (or the rotating machine control command signal Sm to the first rotating machine MG1) reaches the target value. The traveling state determination unit 98 may determine whether or not switching of the first rotating machine MG1 to the drive state is completed based on whether or not an elapsed time from the start of engagement of the brake B is equal to or longer than a predetermined switching completion time determined in advance for determining completion of switching of the first rotating machine MG1 to the drive state.

The switching inhibition unit 96 inhibits switching between the automatic driving and the manual driving in a case where the traveling state determination unit 98 determines that switching of the first rotating machine MG1 to the drive state is not completed when the traveling state determination unit 98 determines that there is the request for switching between the automatic driving and the manual driving and the traveling state determination unit 98 determines that there is the request for switching from the single-drive EV traveling mode to the dual-drive EV traveling mode. That is, the switching inhibition unit 96 inhibits switching between the automatic driving and the manual driving until the traveling state determination unit 98 determines that switching of the first rotating machine MG1 to the drive state is completed in a case where the traveling state determination unit 98 determines that there is the request for switching from the single-drive EV traveling mode to the dual-drive EV traveling mode when the traveling state determination unit 98 determines that there is the request for switching between the automatic driving and the manual driving. The driving control unit 94 executes switching between the automatic driving and the manual driving in a case where the traveling state determination unit 98 determines that switching of the first rotating machine MG1 to the drive state is completed when the traveling state determination unit 98 determines that there is the request for switching between the automatic driving and the manual driving and the traveling state determination unit 98 determines that there is the request for switching from the single-drive EV traveling mode to the dual-drive EV traveling mode. The driving control unit 94 executes switching between the automatic driving and the manual driving in a case where the traveling state determination unit 98 determines that there is no request for switching from the single-drive EV traveling mode to the dual-drive EV traveling mode when the traveling state determination unit 98 determines that there is the request for switching between the automatic driving and the manual driving.

Figure 6:
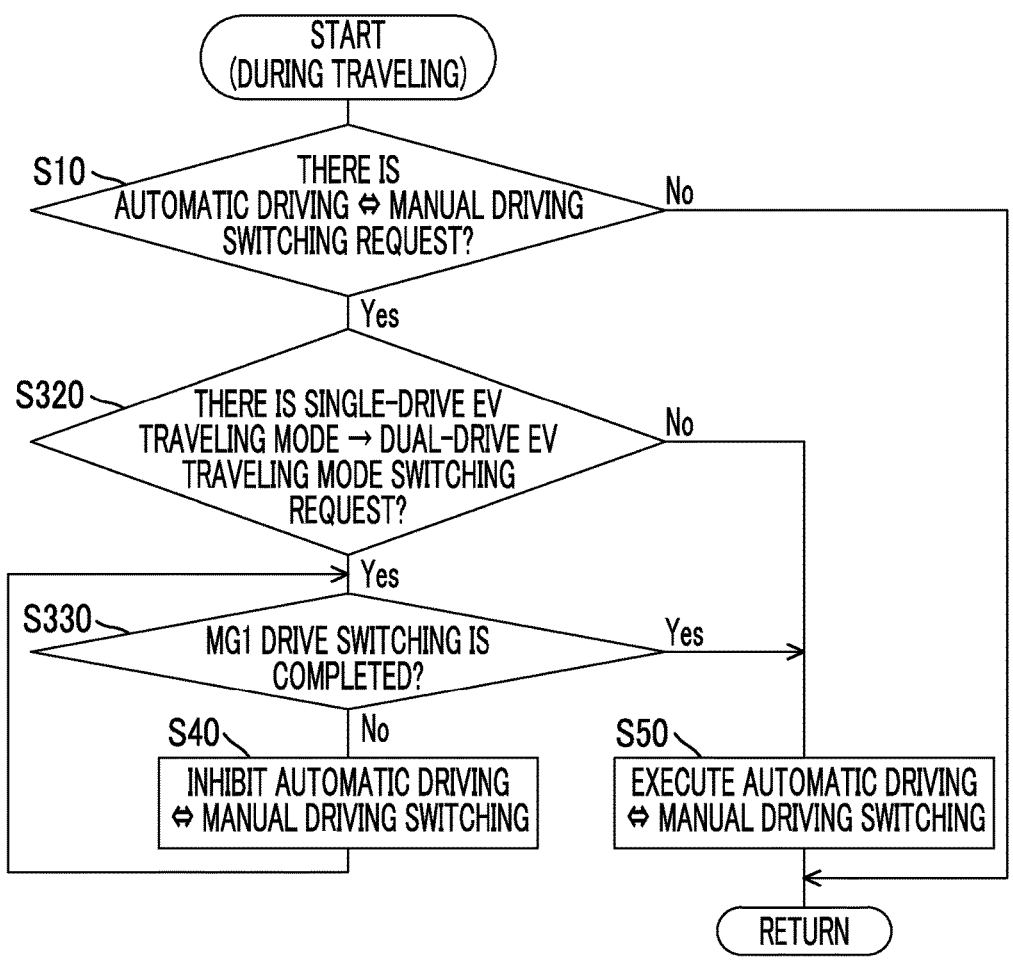
FIG. 6 is a flowchart illustrating a main part of control operation of an electronic control device, that is, control operation for preventing a shock caused by switching between automatic driving and manual driving at the time of switching of traveling modes, and shows an embodiment different from FIG. 3.

FIG. 6 is a flowchart illustrating a main part of control operation of the electronic control device 90, that is, control operation for preventing a shock caused by switching between automatic driving and manual driving at the time of switching of traveling modes, and the flowchart is repeatedly executed during traveling, for example. FIG. 6 shows an embodiment different from FIG. 3.

The flowchart of FIG. 6 is different from the flowchart of FIG. 3 primarily in that the steps of S20 and S30 of FIG. 3 are substituted with steps of S320 and S330, respectively. The difference will be primarily described. In FIG. 6, in a case where the determination of S10 is affirmative, in S320 corresponding to the function of the traveling state determination unit 98, determination is made whether or not there is the request for switching from the single-drive EV traveling mode to the dual-drive EV traveling mode. In a case where the determination of S320 is affirmative, in S330 corresponding to the function of the traveling state determination unit 98, determination is made whether or not switching of the first rotating machine MG1 to the drive state is completed. In a case where the determination of S330 is negative, S40 is executed. Next to S40, S330 is executed. In a case where the determination of S320 is negative or in a case where the determination of S330 is affirmative, S50 is executed.

As described above, with this embodiment, switching between the automatic driving and the manual driving is inhibited until completion of switching of the operation state of the first rotating machine MG1 at the time of switching between the dual-drive EV traveling mode and the single-drive EV traveling mode. Accordingly, control at the time of switching between the dual-drive EV traveling mode and the single-drive EV traveling mode is avoided from being switched between the control for the automatic driving and the control for the manual driving, and discontinuity of the control at the time of switching of the traveling modes does not occur. Therefore, as in Embodiments 1 to 3 described above, it is possible to prevent a shock caused by switching between automatic driving and manual driving at the time of switching of the traveling modes.

Embodiment 5

In Embodiments 1 to 4 described above, various aspects in which switching between the automatic driving and the manual driving is inhibited until completion of switching of the traveling modes from the start of switching of the traveling modes have been described. As described in Embodiment 1 described above, an aspect in which switching to the manual driving is performed in a case where the emergency requirement occurs during the automatic driving has been described. Since the emergency requirement is a situation in which the automatic driving is unable to be performed safely, in a case where the emergency requirement occurs during the automatic driving, it is desirable to perform switching to the manual driving with the highest priority. That is, in a case where the emergency requirement occurs during the automatic driving, it is desirable to perform switching to the manual driving, without inhibiting switching from the automatic driving to the manual driving, until switching of the traveling modes is completed after switching of the traveling modes starts. For this reason, the switching inhibition unit 96 permits switching from the automatic driving to the manual driving even until switching of the traveling mode is completed after switching of the traveling mode starts when switching from the automatic driving to the manual driving is performed with the occurrence of the emergency requirement.

The above-described aspect in which switching from the automatic driving to the manual driving with the occurrence of the emergency requirement is permitted will be described below in connection with a case described in Embodiment 1 described above where the request for switching of the traveling modes is the request for switching from the EV traveling mode to the HV traveling mode.

The traveling state determination unit 98 determines whether or not an emergency requirement occurs in a case where determination is made that there is the request for switching from the automatic driving to the manual driving.

The switching inhibition unit 96 inhibits switching from the automatic driving to the manual driving until the traveling state determination unit 98 determines that the self-sustaining operation of the engine 12 is enabled in a case where the traveling state determination unit 98 determines that there is the request for switching from the EV traveling mode to the HV traveling mode when the traveling state determination unit 98 determines that there is the request for switching from the automatic driving to the manual driving and the traveling state determination unit 98 determines that the emergency requirement does not occur. The driving control unit 94 executes switching from the automatic driving to the manual driving in a case where the traveling state determination unit 98 determines that the emergency requirement occurs when the traveling state determination unit 98 determines that there is the request for switching from the automatic driving to the manual driving. That is, the switching inhibition unit 96 permits switching from the automatic driving to the manual driving even during a period of transition in which the traveling mode switching control unit 92 is performing switching from the EV traveling mode to the HV traveling mode in a case where the traveling state determination unit 98 determines that there is the request for switching from the automatic driving to the manual driving and the traveling state determination unit 98 determines that the emergency requirement occurs.

FIG. 7 is a flowchart illustrating a main part of control operation of the electronic control device 90, that is, control operation for preventing a shock caused by switching between automatic driving and manual driving at the time of switching of traveling modes. The flowchart of FIG. 7 may be repeatedly executed during traveling, for example. FIG. 7 shows an embodiment different from FIG. 3.

The flowchart of FIG. 7 is different from the flowchart of FIG. 3 primarily in that the steps of S10, S40, and S50 of FIG. 3 are substituted with steps of S410, S440, and S450, respectively, and a step of S415 is added. The difference will be primarily described. In FIG. 7, first, in S410 corresponding to the function of the traveling state determination unit 98, determination is made whether or not there is the request for switching from the automatic driving to the manual driving. In a case where the determination of S410 is negative, the routine ends. In a case where the determination of S410 is affirmative, in S415 corresponding to the function of the traveling state determination unit 98, determination is made whether or not the emergency requirement occurs. In a case where the determination of S415 is negative, S20 is executed. In a case where the determination of S20 is affirmative, S30 is executed. In a case where the determination of S30 is negative, in S440 corresponding to the function of the switching inhibition unit 96, switching from the automatic driving to the manual driving is inhibited. Next to S440, S30 is executed. In a case where the determination of S415 is affirmative, in a case where the determination of S20 is negative, or in a case where the determination of S30 is affirmative, in S450 corresponding to the function of the driving control unit 94, switching from the automatic driving to the manual driving is executed.

As described above, with this embodiment, as in Embodiments 1 to 4 described above, it is possible to prevent a shock caused by switching from the automatic driving to the manual driving at the time of switching of the traveling modes. Since switching from the automatic driving to the manual driving is inhibited even until switching of the traveling modes is completed after switching of the traveling modes starts when switching from the automatic driving to the manual driving is performed with the occurrence of the emergency requirement, switching from the automatic driving to the manual driving is performed quickly even during switching of the traveling modes in a situation in which the automatic driving is unable to be performed safely.

Various Modification Embodiments

Although the embodiments of the disclosure have been described in detail based on the drawings, the disclosure is applied to other aspects.

For example, in Embodiment 1 described above, a case where the time of switching of the traveling modes is the time of switching from the EV traveling mode to the HV traveling mode has been illustrated. The EV traveling mode includes not only the single-drive EV traveling mode but also the dual-drive EV traveling mode. In a case of the dual-drive EV traveling mode, the brake B should be released at the time of switching to the HV traveling mode. However, since the release of the brake B is performed prior to the start of the engine 12 (the start of cranking by the first rotating machine MG1), even in a case of the dual-drive EV traveling mode, as in a case of the single-drive EV traveling mode, completion of switching to the HV traveling mode may be determined according to the self-sustaining operation of the engine 12 being enabled. Therefore, even in a case where the EV traveling mode is the dual-drive EV traveling mode, the flowchart of FIG. 3 can be used.

In Embodiment 4 described above, a case where the time of switching between the single-drive EV traveling mode and the dual-drive EV traveling mode is the time of switching from the single-drive EV traveling mode to the dual-drive EV traveling mode has been illustrated. The disclosure can be applied to even a case where the time of switching between the single-drive EV traveling mode and the dual-drive EV traveling mode is the time of switching from the dual-drive EV traveling mode to the single-drive EV traveling mode. Specifically, in a case where it is the time when switching from the dual-drive EV traveling mode to the single-drive EV traveling mode is performed, the first rotating machine MG1 in the drive state is brought into the operation stop state and the MG1 torque Tg decreases to zero. For this reason, completion of switching from the dual-drive EV traveling mode to the single-drive EV traveling mode may be determined according to completion of switching of the first rotating machine MG1 to the operation stop state, for example. The traveling state determination unit 98 determines whether or not switching of the first rotating machine MG1 to the operation stop state is completed based on whether or not the MG1 torque Tg (or the rotating machine control command signal Sm to the first rotating machine MG1) reaches the target value (in this case, for example, a value of zero), for example. In the flowchart of FIG. 6, in S320, determination is made whether or not there is a request for switching from the dual-drive EV traveling mode to the single-drive EV traveling mode, and in S330, determination is made whether or not switching of the first rotating machine MG1 to the operation stop state is completed.

In Embodiment 5 described above, although an aspect in which switching from the automatic driving to the manual driving with the occurrence of the emergency requirement is permitted in connection with a case where the request for switching of the traveling modes is the request for switching from the EV traveling mode to the HV traveling mode, the disclosure is not limited to this aspect. The disclosure can be applied to a case of a request for switching of traveling modes (for example, the request for switching from the HV traveling mode to the EV traveling mode, or the request for switching between the single-drive EV traveling mode and the dual-drive EV traveling mode) different from the request for switching from the EV traveling mode to the HV traveling mode.

In the embodiments described above, although the automatic driving basically performs running (acceleration/deceleration), turning (steering), stopping (braking), or the like in the vehicle 10 automatically with control operation by the electronic control device 90 without depending on a driving operation of a driver (accelerator operation, steering operation, or brake operation), the disclosure is not limited to this aspect. For example, known cruise control for controlling drive torque such that the vehicle speed follows a set vehicle speed in consideration of an interval from a preceding vehicle or the like may be included in the automatic driving.

In the embodiments described above, although a case where the brake B is used as the lock mechanism has been illustrated, the disclosure is not limited thereto. The lock mechanism may be, for example, a one-way clutch which permits the rotation of the crankshaft of the engine 12 in a positive rotation direction and inhibits the rotation of the crankshaft of the engine 12 in a negative rotation direction, a dog clutch, a dry type engagement device, an electromagnetic frictional engagement device (electromagnetic clutch) configured such that an operation state is controlled by an electromagnetic actuator, a magnetic powder type clutch, or the like. In an aspect in which the dual-drive EV traveling mode is not provided as a traveling mode, the lock mechanism is not necessarily provided.

In the embodiments described above, although the vehicle 10 has a gear train having a coupling relationship in which the second rotating machine MG2 is disposed on an axis different from the axis of the input shaft 20, for example, a gear train having a coupling relationship in which the second rotating machine MG2 is disposed on the same axis as the axis of the input shaft 20, or the like may be provided. Drive wheels W to which the second rotating machine MG2 is coupled such that power transmission is possible may not necessarily be the same as the drive wheels 14 to which the output rotating member of the gear shift unit 22 is coupled such that power transmission is possible. For example, one of the front wheels and the rear wheels may be the drive wheels 14, and the other wheels may be the drive wheels W. In such a case, the drive wheels 14 and the drive wheels W are drive wheels, and both of the output rotating member of the gear shift unit 22 and the second rotating machine MG2 are coupled to the drive wheels such that power transmission is possible.

In the embodiments described above, although the planetary gear mechanism 38 is a single planetary, the planetary gear mechanism 38 may be a double planetary. The planetary gear mechanism 38 may be a differential gear device in which a pinion rotationally driven by the engine 12 and a pair of bevel gears in mesh with the pinion are operatively coupled to the first rotating machine MG1 and the drive gear 24. The planetary gear mechanism 38 may be a mechanism in which two or more planetary gear devices are coupled with a part of rotating elements constituting the planetary gear devices, and an engine, a rotating machine, and drive wheels are coupled to the rotating elements of the planetary gear devices such that power transmission is possible.

In the embodiments described above, although the vehicle 10 includes the engine 12, the first rotating machine MG1, and the second rotating machine MG2 as a plurality of drive power sources, the disclosure is not limited to this aspect. For example, in an aspect of switching between the HV traveling mode and the EV traveling mode, a vehicle may include at least an engine and a rotating machine. Accordingly, the disclosure can be applied to a vehicle including, for example, an engine, a transmission provided in a power transmission path between the engine and drive wheels, and a rotating machine coupled to an input rotating member of the transmission such that power transmission is possible. In an aspect of switching between the single-drive EV traveling mode and the dual-drive EV traveling mode, a vehicle may include at least two rotating machines. Therefore, the disclosure can be applied to, for example, an electric vehicle that includes two rotating machines and is capable of switching between EV traveling using either rotating machine and EV traveling using both rotating machines. In summary, the disclosure can be applied as long as a vehicle includes a plurality of drive power sources, switches among a plurality of traveling modes, in which different drive power sources are used as a drive torque source, according to a traveling state, and switches between automatic driving and manual driving.

The above description is merely an embodiment and the disclosure can be implemented in aspects to which various modifications and improvements are added based on knowledge of those skilled in the art.

What is claimed is:
1. A traveling control device for a vehicle, the vehicle including drive power sources, the traveling control device comprising
an electronic control device configured to
select, according to a traveling state of the vehicle, a traveling mode from among traveling modes, one or more predetermined drive power sources among the drive power sources being used for driving the vehicle in each traveling mode, the one or more predetermined drive power sources in the respective traveling modes being different from each other,
drive the vehicle by using the selected traveling mode, switch between automatic driving by automatic driving control and manual driving by a driving operation from a driver, and when the selected traveling mode switches, inhibit, after switching of the selected traveling mode starts, switching between the automatic driving and the manual driving until the switching of the selected traveling mode is completed.

2. The traveling control device according to claim 1, wherein:

the drive power sources include an engine and a rotating machine;

the traveling modes include a hybrid traveling mode in which at least the engine is used as a drive torque source generating drive torque when the vehicle travels, and a motor traveling mode in which the rotating machine is used as the drive torque source; and the electronic control device is configured to inhibit, when switching from the motor traveling mode to the hybrid traveling mode is performed, the switching between the automatic driving and the manual driving until a self-sustaining operation of the engine is enabled after the engine starts.

3. The traveling control device according to claim 1, wherein:

the drive power sources include an engine and a rotating machine;

the traveling modes include a hybrid traveling mode in which at least the engine is used as a drive torque source generating drive torque when the vehicle travels, and a motor traveling mode in which the rotating machine is used as the drive torque source; and the electronic control device is configured to inhibit, when switching from the hybrid traveling mode to the motor traveling mode is performed, the switching between the automatic driving and the manual driving until a stop of the engine is completed.

4. The traveling control device according to claim 1, wherein:

the drive power sources include an engine, a first rotating machine, and a second rotating machine;

the traveling modes include a hybrid traveling mode in which at least the engine is used as a drive torque source generating drive torque when the vehicle travels, and a dual-drive motor traveling mode in which both of the first rotating machine and the second rotating machine are used as the drive torque source; and the electronic control device is configured to inhibit, when switching from the hybrid traveling mode to the dual-drive motor traveling mode is performed, the switching between the automatic driving and the manual driving until a stop of the engine is completed and until transition to dual-drive of the first rotating machine and the second rotating machine is completed.

5. The traveling control device according to claim 1, wherein:

the drive power sources include a first rotating machine and a second rotating machine;

the traveling modes include a dual-drive motor traveling mode in which both of the first rotating machine and the second rotating machine are used as a drive torque source generating drive torque when the vehicle travels, and a single-drive motor traveling mode in which the second rotating machine is exclusively used as the drive torque source; and the electronic control device is configured to inhibit, when switching between the dual-drive motor traveling mode and the single-drive motor traveling mode is performed, the switching between the automatic driving and the manual driving until switching of an operation state of the first rotating machine is completed.

6. The traveling control device according to claim 1, wherein the electronic control device is configured to switch to the manual driving when an emergency requirement occurs during the automatic driving, the emergency requirement indicating the automatic driving is unable to be performed safely, and permit, when switching from the automatic driving to the manual driving is performed with occurrence of the emergency requirement, the switching from the automatic driving to the manual driving, even until switching of the selected traveling mode is completed after the switching of the selected traveling mode starts.

7. The traveling control device according to claim 2, wherein a state in which the self-sustaining operation of the engine is enabled includes a state in which torque of the engine reaches a predetermined target value.

8. The traveling control device according to claim 2, wherein a state in which the self-sustaining operation of the engine is enabled includes a state in which an elapsed time from the start of the switching of the traveling modes becomes equal to or longer than a predetermined time.

* * * * *